May 15, 1962 W. W. KENNEDY 3,034,531
MULTIPLE LOUVER DAMPER
Filed Oct. 28, 1960 4 Sheets-Sheet 1

INVENTOR
Walter W. Kennedy
By Cullen, Pitzner, Hubbard & Wolfe
ATTORNEYS

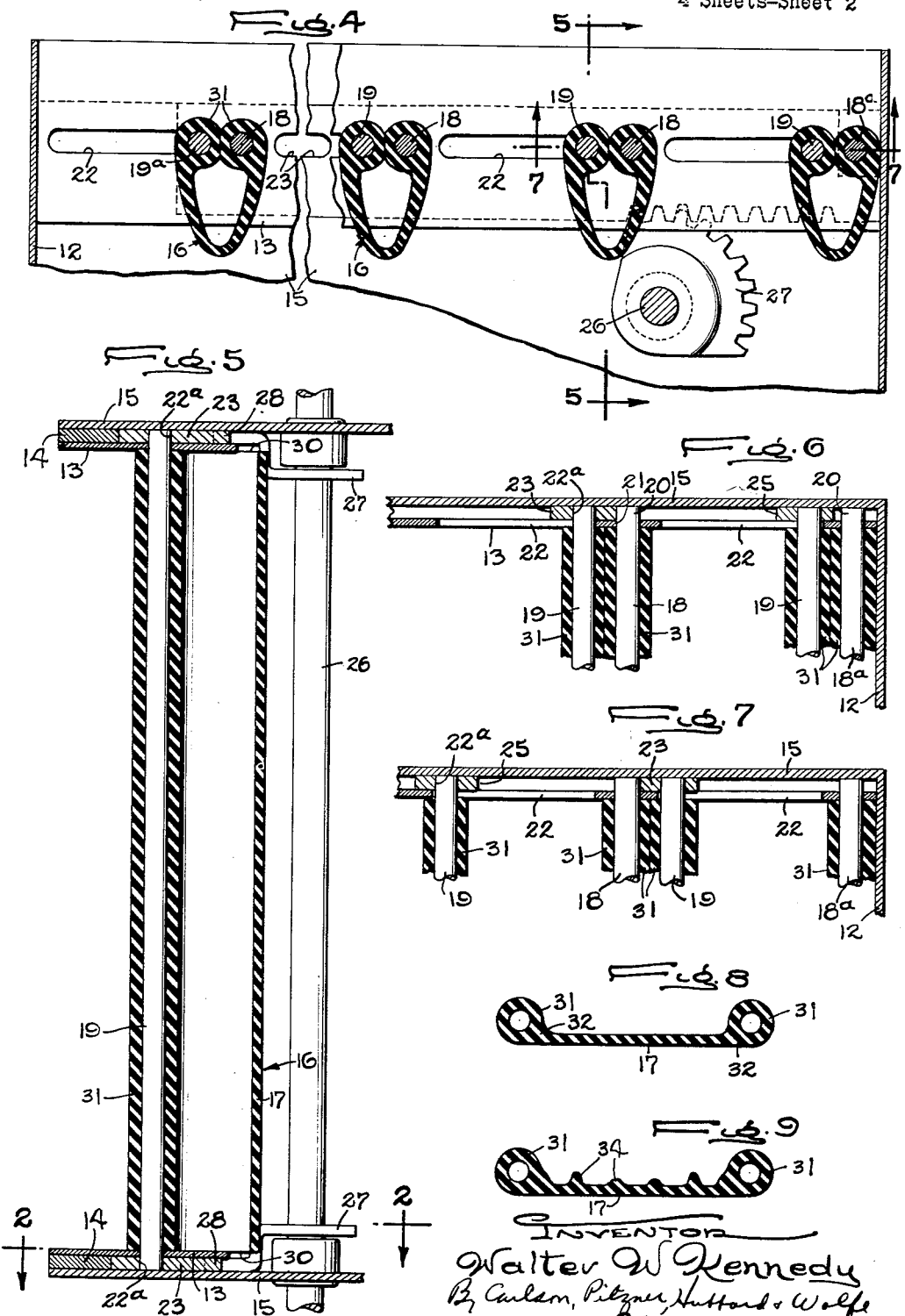

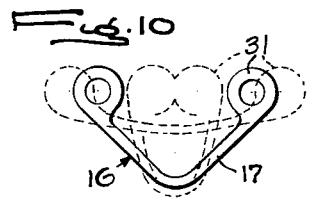
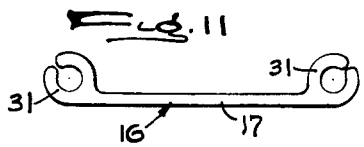
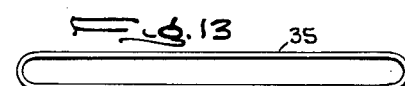
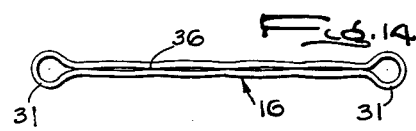
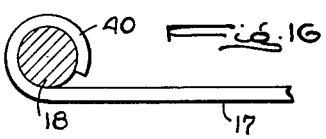
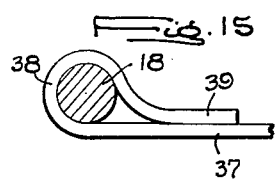
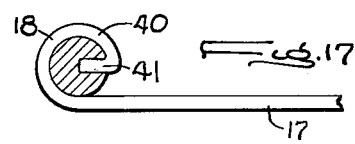
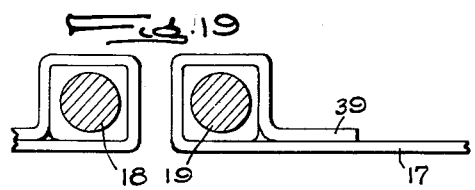
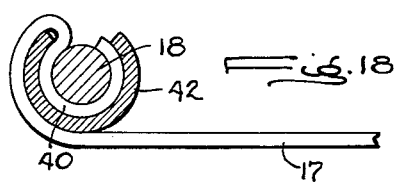
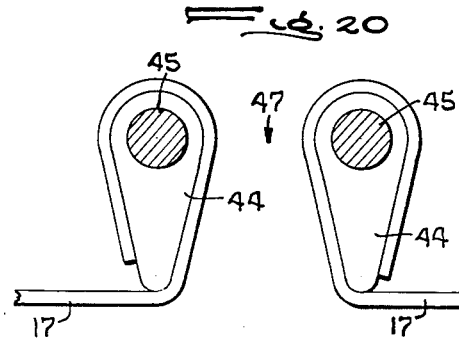

United States Patent Office 3,034,531
Patented May 15, 1962

3,034,531
MULTIPLE LOUVER DAMPER
Walter W. Kennedy, Rockford, Ill., assignor to Barber-Colman Company, Rockford, Ill., a corporation of Illinois
Filed Oct. 28, 1960, Ser. No. 65,647
11 Claims. (Cl. 137—601)

This invention relates to multiple louver dampers for use in controlling the flow of air in air conditioning systems and has more particular reference to dampers in which the louvers or vanes are expansible and contractible transversely of the duct.

The general object is to provide a damper of the above character which is better suited than prior dampers to control the flow of air under relatively high pressure and close the duct effectively when the louvers are fully expanded.

Another object is to achieve edgewise expansibility of the louvers by forming the same from a strip of flexible material supported from its side edges.

A further object is to form the louvers from resiliently yieldable material such as rubber and utilize the yielding of this material not only to effect a pressure-tight seal between the adjacent louvers but also between the ends of the louvers and the duct walls.

Still another object is to utilize the pressure of the oncoming air in the duct to effect a flexing of the louver strips and maintain a desired cross sectional shape thereof in all degrees of opening of the damper.

The invention also resides in the novel construction and mounting of the louvers, which permits economical formation thereof from rubber or like material while, at the same time, insuring proper sealing at the louver ends.

Other objects and advantages of the invention will become apparent from the following detailed description taken in connection with the accompanying drawings, in which:

FIGS. 3 and 4 are fragmentary sectional views taken along the line 3—3 of FIG. 1 showing the damper vanes in closed and open positions.

FIG. 5 is a fragmentary section taken along the line 5—5 of FIG. 4.

Figure 3:
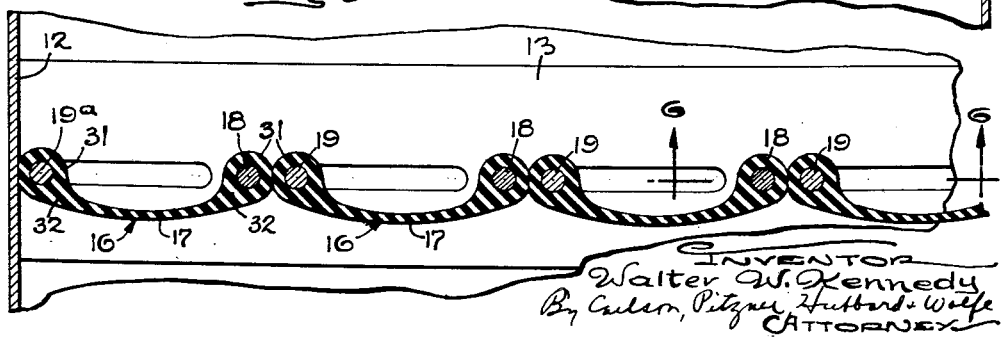

FIGS. 6 and 7 are fragmentary sections taken along the lines 6—6 and 7—7 of FIGS. 3 and 4 respectively.

FIGS. 8 to 11 are cross-sections of different forms of the damper vanes.

FIG. 12 is a fragmentary view of the damper having another form of damper vane.

FIGS. 13 to 18 are fragmentary views illustrating different ways of forming the damper vanes.

FIGS. 19 and 20 are fragmentary views of adjacent vanes having different forms of supporting rods.

Figure 21:
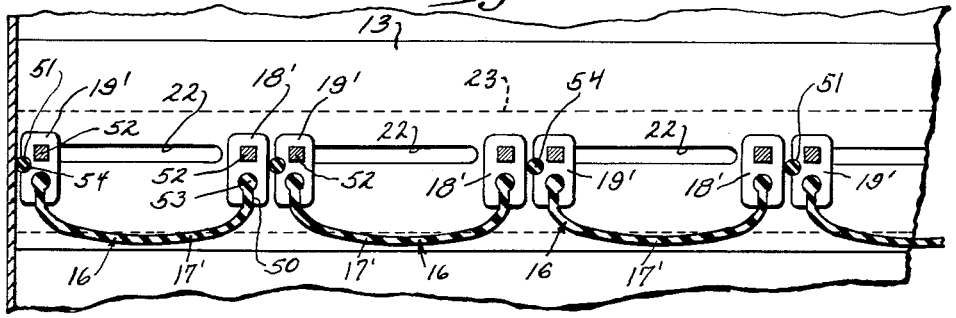
Figure 22:
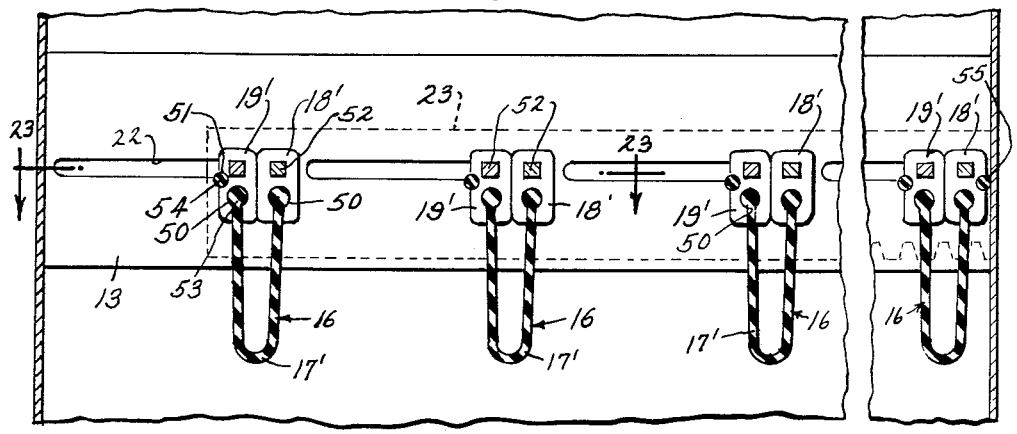

FIGS. 21 and 22 are fragmentary views similar to FIGS. 3 and 4 showing still another form of the invention.

Figure 23:
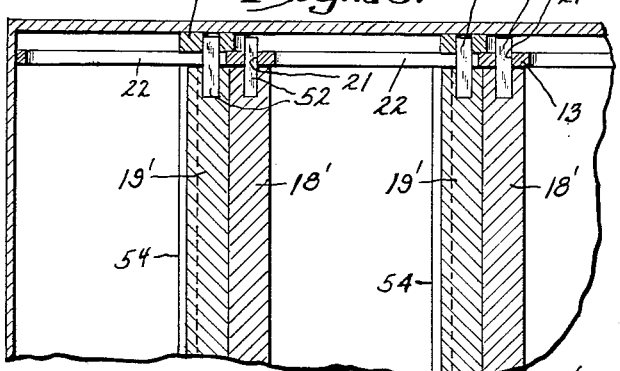

FIG. 23 is a fragmentary section taken along the line 23—23 of FIG. 22.

The improved damper, as shown in the drawings, includes a generally rectangular frame 10 adapted to fit closely within the cross-section of a duct 11 through which the flow of air under substantial pressure is to be controlled. Herein, end walls 12 of the frame are spanned by flat bars 13 and cooperate therewith to define the rectangular damper opening. The bars are separated by spacer strips 14 which are welded to the bars and to plates 15 rigidly spanning and joined to the walls 12.

In accordance with the present invention, the damper proper is formed by a plurality of louvers 16 comprising strips 17 of flexible material supported from their side edges for edgewise folding and expansion into and out of edge-to-edge engagement to close or variably open the area defined by the frame 10. Each strip is equal in length to the width of the frame opening, and opposite side edges are secured along spaced rods 18 and 19, at least one of which is mounted in the frame for bodily movement toward and away from each other to effect the expansion of the louvers.

In the preferred form shown in FIGS. 1 to 8, the rods 18 are rigid and of round cross-section and span the side walls of the frame with opposite ends 20 fixed in the frame bars 13 by projection through holes 21 (FIGS. 2, 5, and 6) and abutment with the side plates 15 of the frame. The axes of the holes lie in a common plane and are spaced apart uniformly along the frame with the hole for one terminal rod 18ª disposed closely adjacent one of the end walls 12 of the frame (see FIG. 2).

Figure 2:
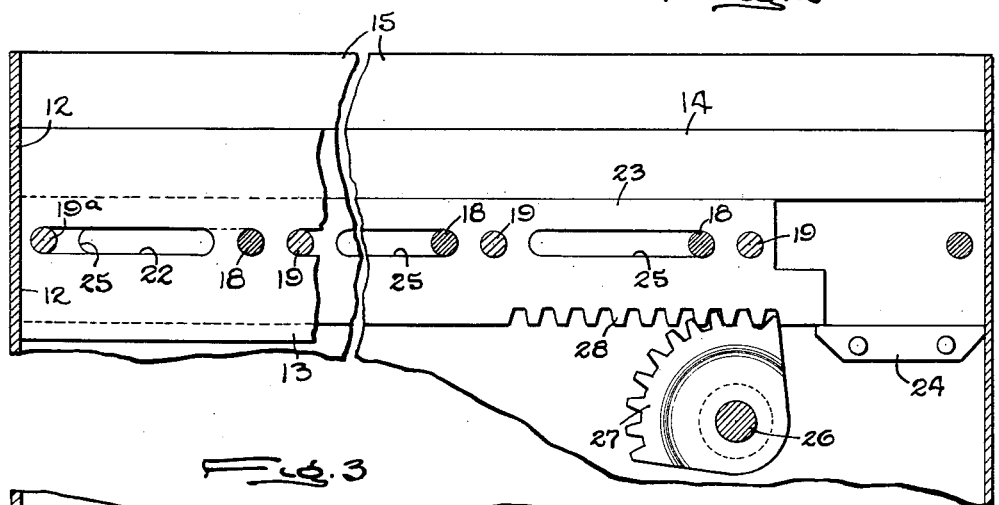
FIG. 2 is a fragmentary sectional view of the damper actuating mechanism, the section being taken along the broken line 2—2 of FIG. 5.

One of the bars 19 parallels and is disposed between the bars 18 with opposite end portions projecting through elongated slots 22 in the frame bars 13 and then through holes 22ª in slides 23 (FIGS. 2 and 5) each disposed between one of the bars 13 and the adjacent plate 15 and guided for longitudinal movement by the spacer 14 and a short bar 24 fixed to the plate on the outer side of the slide. Preferably, though not necessarily, the rods 19 lie in the same plane as the rods 18 and are uniformly spaced apart with the terminal rod 19ª opposite the terminal rod 18ª similarly disposed adjacent the other end wall 12 of the frame when the slides 23 are disposed in damper closing position (FIGS. 2 and 3). In this position, the rods 19 are disposed at the left ends of the slots 22 in the bars 13, these slots being long enough to allow the rods 19 and the slides to move to the right to the fully open position of the damper as shown in FIG. 4.

To permit such movement of the slides, the fixed rods 18 project through slots 25 punched in and spaced along the slides 23. Thus, the fixed rods 18 are disposed in the right ends of the slots 25 in the damper closed position of the slides 23 (FIGS. 3 and 7) and in the left ends after shifting of the slides to the right to open the damper as shown in FIGS. 4 and 6.

Endwise movement of the slides 23 to open and close the damper may be effected in various ways in response to turning of an operating shaft 26 projecting through and journaled in the frame walls 15 and coupled to the slides by a suitable motion converting connection. Herein, the latter comprises gear segments 27 fast on the shaft and meshing with rack teeth 28 formed along the outer edges of the slides. The latter may be shifted back and forth by rocking a crank 29 (FIG. 1) fast on one end of the shaft outside of the duct 11.

To achieve most effective sealing of the adjacent edges of the louvers 16 against each other and opposite ends 30 of the louvers against the internal surface of the frame, it is preferred to form the strips 17 of relatively soft and resilient material with opposite edge portions of the strip curled at least partially around adjacent ones of the rods 18 and 19 so as to form yieldable coverings along the outer sides of these rods. One preferred way of accomplishing this is to form the strip 17 of relatively soft rubber or like material which may be extruded by conventional methods and made integral with hollow beads 31 through which the rods 18 and 19 may be inserted. Preferably, the thickness of the strip decreases progressively starting at the full diameter of the beads, the major width of the strip being substantially uniform in thickness (FIG. 8).

The beads 31 may be solid tubes for endwise insertion of the rods 18 and 19 or they may be split longitudinally, as shown in FIG. 11, and thus adapted to be pressed sidewise over the supporting rods. When formed of rubber and by ordinary extrusion, the strips are about 3/64 of an inch thick at the centers and the beads are about 1/8 of an inch thick in order to provide ample yieldability for effective sealing of the louver edges. Preferably, the hardness of the rubber is about 40–45 as measured on a Shore durometer.

The louver strips 17 may be extruded to the cross-sectional shape shown in FIG. 8 in which the web connecting the tubes 31 is initially flat and becomes bent as an incident to assembly on the supporting rods 18 and 19 as above described. With certain rubber compositions or other materials, it may be desirable to reduce the amount of flexing of the web which takes place as an incident to its edgewise expansion from open to fully closed position. This may be accomplished by initially extruding the rubber to a cross-sectional shape as shown in full in FIG. 10, in which the web is partially flexed to a shape which is intermediate those which result from full expansion and contraction of the louver as shown in phantom in FIG. 10.

To provide for uniformity in the cross-sectional shape of the louvers in their various degrees of expansion, it may be desirable with some materials to vary the thickness of the web across its width and thereby control the lines of folding or flexing of the webs. This may be accomplished by increasing the thickness of the web progressively and outwardly, beginning at points adjacent the beads 31, as indicated at 32 in FIGS. 3 and 8. Or, where the flexible web is made of increased width, as shown in FIG. 12, maintenance of a true V-shaped cross-section may be achieved by weakening the web along its center line, as indicated at 33 in FIG. 12. Such increased bulging of the louvers and deepening of the V's may be used in installation where a long throw of the discharged air streams beyond the damper is desirable.

To utilize the force of the oncoming air to maintain the louvers 16 of the proper cross-sectional shape in spite of their flexibility, each strip 17 is made at least as wide and preferably somewhat wider than the maximum spacing of its supporting rods 18 and 19. As a result and when the damper is closed (FIG. 3), each strip bulges slightly out of the plane of the rods and in the direction of air flow through the duct (FIG. 3). As the rods of each pair are moved toward each other and the louvers contracted edgewise to open the damper, the strips 17 bend or fold along their longitudinal center lines, thus progressively increasing the bulge which becomes a maximum when the slides 33 are in the limit open position as shown in FIG. 4. In this position of maximum opening, the beads 31 of each strip come into sidewise abutment with each other and the opposed sides of the adjacent louvers present smooth progressively diverging surfaces to the air streams flowing through the spaces between the adjacent louvers.

Effective sealing of the louver ends 30 against the interior of the frame defined by the surfaces of the bars 13 is attributable to the resilient character of the strips 17, their close fit between these surfaces and the action of the oncoming air on the hollow side of the strips in holding the latter to a definite shape with the bulges therein projecting downstream. Accordingly, the strips are cut to lengths precisely equal to or slightly greater than the width of the frame between the surfaces of the bars 13 so as to completely span the frame. The ends 30 of the strips thus abut directly against the smooth surfaces of the bars and rub across the latter as the strips bend and their cross-section changes during opening and closing of the damper. Since the strips are supported intermediate their side edges, impingement of the oncoming air against the concave side of the strips and over the entire area thereof maintains full bulging of the strips and a uniform cross-section of each strip throughout its length. The strip ends 30, although free, are thus held against wrinkling or bending away from the surfaces of the bars 13 in spite of the substantial pressure drop across the damper when the latter is closed or substantially so.

Figure 1:
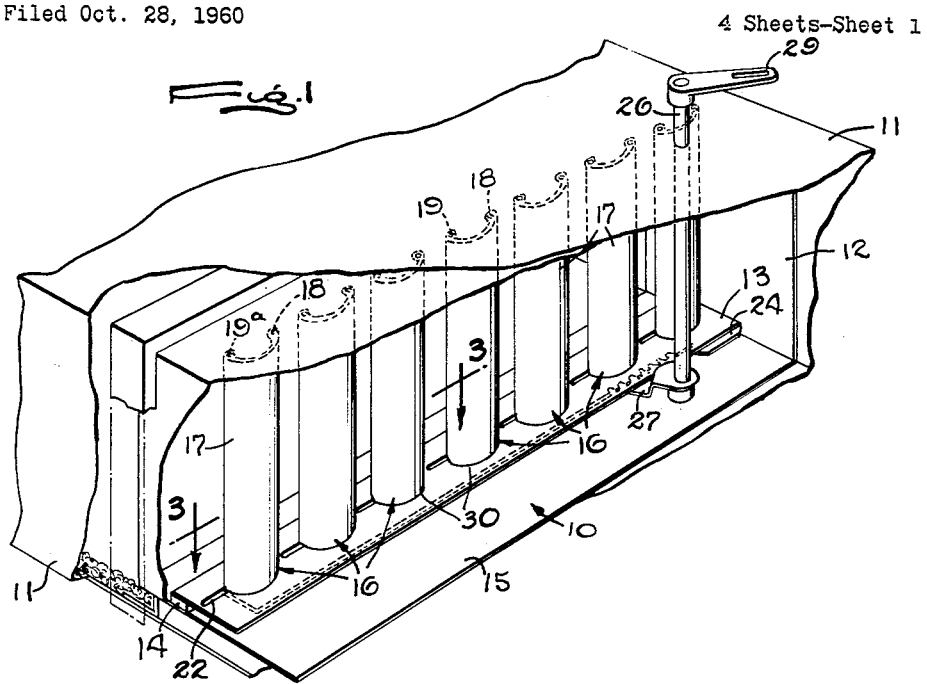
FIGURE 1 is a fragmentary perspective view of an air duct equipped with a damper embodying the novel features of the present invention.

The bars 13 are of course made wide enough to fully overlap the arcuate ends 30 of the strips when the damper is closed (FIG. 3) thus preventing substantial leakage of air around the ends. Such overlapping is on the side of the slots 22 as shown in FIGS. 1 and 3, or, in other words, in the direction of bulging of the louvers caused by the pressure of the air delivered to the duct. By making the bars 13 wide enough, as shown, to overlap the ends 30 in either direction, the damper is made reversible and may be mounted with the shaft 26 on the accessible side of the louvers.

By constructing the webs 17 of the louvers, as shown in FIG. 9, the damper may be adapted to withstand increased air pressures without danger of the ends 30 becoming deformed and thus bent away from the surfaces of the bars when the damper is fully closed and the louvers subjected to the maximum pressure. Thus, the end portions of the webs may be reinforced against longitudinal bending by forming one or more ribs 34 on the webs, preferably extending along and spaced apart laterally across the web. The ribs adjacent the beads 31 are preferably made thicker. Ribs of this character may easily be formed along with the louver proper where the latter is produced by extrusion or by molding.

It will be apparent that louvers of the above character adapted for transverse flexing and effective sealing both at the edges and at the ends 30 may be formed of other materials and secured to the supporting bars 18 and 19 in various ways. Among the flexible materials available are leather, canvas, fabrics impregnated or coated with rubber or the like, and certain yieldable plastics such as polyethylene.

Other available methods of attaching the strips to the supporting rods are illustrated in FIGS. 13 to 23. Thus, the strip with the side beads 31 may be formed by flattening a tube 35 of plastic material and heat-sealing or cementing the central areas of the walls together at 36 while leaving tubular edges 31. Or, a single sheet 37 of material of the desired softness may be wrapped as indicated at 38 around the rods 18 and 19 and the reversely bent margins 39 cemented or heat-sealed to the intermediate portion of the web (see FIG. 15).

When the material is capable of being cemented directly to the supporting rods, the edges of the web 17 need only be partially curled around the rods as indicated at 40 (FIG. 16). A mechanical fastening may be effected by pressing the edges of the curls 40 into longitudinal slots 41 cut in the rods 18 and 19 (FIG. 17). Or the curls 40 may be clamped to the rods by separate metal tubes 42 slid endwise onto the curls, the web being bent reversely around the tubes to provide the desired yieldable sealing surfaces at the outer edges of the mounted strip 17 (FIG. 18).

Where greater side sealing areas are required, the rods 18 and 19 may be formed of square cross-sections (FIG. 19) intermediate their ends and covered by the yieldable web material either by extrusion or molding or by the method illustrated in FIG. 15.

The method shown in FIG. 20 is adaptable for use in controlling the cross-sectional shape of the air passages between the adjacent louvers when the damper is partially open. Thus, the rods may be widened and tapered transversely, as indicated at 44 (FIG. 20), and formed at the thick edges with end trunnions 45 mounted in the bars 13 and slides 23 in the same manner as the rods 18 and 19 above described. The web 17 is extended first around the free edges of the bars and then is bent reversely around the trunnion axes and finally cemented to the opposite side of the bars. Yieldable coverings thus formed on adjacent sides of the bars define side walls for the intervening passage 47 whose cross-sectional shape will be determined by the shape of the bars.

In operation, the damper will be fully open when the shaft 26 is turned clockwise to the limit position shown in FIG. 4. Then the louvers 16 are completely collapsed with the beads 31 of each strip 17 lying in side to side contact, thus providing openings of maximum width between the adjacent louvers. As the shaft is turned counter clockwise, the rods 18 and 19 supporting the individual strips 17 are separated from each other and the louvers are expanded edgewise to correspondingly reduce the widths of the open areas between the adjacent louvers. As the turning of shaft is continued, the rods 19 move along the slots 22 and, finally the beads surrounding these rods come into sidewise abutment with the stationary beads of the adjacent louvers. Irregularities in the contacting surfaces may be compensated for by increasing the torque applied to the shaft, thus compressing the high spots and flattening the beads into full contact at all points along their lengths. Such contact, together with the seals at the ends 30 of the strips, tightly closes the full area of the frame 10, which, by the action of the oncoming air in holding the proper sectional shape of the louvers as above described, will be maintained effectually closed under the relatively high pressure now being used in many air conditioning systems.

Instead of making the sealing elements 31 integral with the flexible webs 17, these elements may be formed separately. Such a modification is shown in FIGS. 21, 22, and 23 in which the parts corresponding to those of FIGS. 3, 4, and 5 are indicated by the same but primed numbers. In this instance, the rods 18' and 19' are metal extrusions formed with grooves 50 along the downstream sides and a groove 51 along at least one side edge. Pins 52 preferably of square cross-section are secured to opposite ends of the rods and project into the fixed holes 21 and the slots 22, the same as in the preferred construction first described.

The webs 17' preferably comprise strips of rubber extruded to form beads 53 along both side margins, these being seated in the enlarged bottom portions of the grooves and thus fastened securely to the two rods. Separately formed rubber strips 54 preferably of circular cross-section are similarly forced into the grooves 51 and thus fastened to the left side of each of the rods 19'. A similar strip 55 is fastened in a groove in the right side of the stationary rod 18' which is disposed adjacent the duct wall thus forming a continuous seal along the latter.

With the rods 18' and 19' mounted as before in the stationary and movable plates 13 and 23, the damper will be open (FIG. 22) when the plate 23 and the rods 19' are shifted to the right. Upon reverse movement to the left hand limit position (FIG. 21), the sealing strips 54 will be brought into full engagement with and compressed against the rods 18' and the left duct wall thus completely closing the duct passage.

In addition to providing an efficient high pressure air valve, the improved damper is simple in construction and economical to manufacture. The air flows freely through the openings between adjacent louvers without change in direction, thus enabling the damper to be disposed close to the discharge end of the duct.

This application is a continuation in part of my copending application Serial No. 683,305, filed September 11, 1957, now abandoned.

I claim as my invention:

1. An air damper having in combination a generally rectangular frame, a series of parallel first rods spaced apart along one dimenstion of said frame and rigidly spanning the perpendicular dimension, said frame including two slides guided for endwise movement along opposite sides of the frame adjacent the corresponding ends of said rods, a similar series of second rods lying substantially in the plane of and paralleling said first rods, opposite ends of said second rods being secured to said slides, a plurality of edgewise expansible louvers arranged edge to edge within said frame and each comprising a flexible strip of yieldable material capable of yielding and being deformed under compression and having one continuous side edge curled around and secured along one of said first rods and the opposite continuous edge similarly curled around and secured to an adjacent one of said second rods, each of said strips being wider than the spacing of said first rods whereby to remain bent transversely by virtue of the flexibility of said material and bulge out of said plane whereby to assume arcuate cross-sections of different curvatures according to the degree of expansion of said louvers, means for reciprocating said slides back and forth to move each of said second rods and bring the louver edge supported thereby into and out of edgewise abutment with the edge of the adjacent louver, opposite ends of each strip being in abutment and tight sealing engagement with the interior of said frame when said louvers are fully expanded.

2. In an air control damper, the combination of a plurality of edgewise expansible and contractible louvers each comprising laterally spaced tubes of non-rigid resilient material capable of yielding and flowing when placed under compression and a flexible web connecting said tubes, parallel rods extending through the tubes of each louver, said tubes being uninterrupted throughout their lengths so as to form continuous sealing surfaces along opposite edges of the louver, and means engaging the projecting ends of said rods and supporting the latter for relative bodily movement of the tubes of each louver toward and away from each other to bring said edge surfaces of adjacent louvers into and out of sealing engagement.

3. A damper as defined by claim 2 in which said tubes and webs are extruded rubber.

4. A damper as defined by claim 2 in which the thickness of said web increases outwardly beginning at lines adjacent said tubes.

5. A damper as defined by claim 2 in which the outer margins of said web progressively increase in thickness substantially to the full diameter of the tubes.

6. A damper as defined by claim 2 in which at least the end portions of said web are longitudinally ribbed.

7. A damper as defined by claim 2 in which said tubes comprise opposite margins of the web folded reversely on the web with the edges of such margins sealed to the web.

8. A damper as defined in claim 2 in which said tubes are split longitudinally and thus expandable for sidewise removal from said rods.

9. In an air flow control damper, the combination of, a plurality of first parallel rods laterally spaced apart, a plurality of second rods paralleling and alternating with said first rods, said first and second rods being disposed substantially in a common plane and arranged in pairs laterally spaced apart along the plane and each comprising one of said first rods disposed on one side of the pair and one of said second rods disposed on the other side of the pair, whereby to leave air passages between the adjacent first and second rods of two adjacent pairs, a plurality of edgewise flexible webs each spanning the rods of one of said pairs and having side margins respectively secured to the first and second rods of the pair, said webs and their supporting rods forming a plurality of louvers separated by said passages and expansible and contractible edgewise to vary the widths of the passages between the adjacent edges of the adjacent louvers, and means providing airtight seals between the adjacent edges of said louvers when the latter are fully expanded to close said air passages, said last mentioned means including a seal member composed of yieldable material secured to at least one rod of each louver along the outer side edge thereof and presenting a substantially continuous yieldable surface which becomes compressed against the opposed surface of the adjacent louver when the louvers are fully expanded into edge to edge abutment.

10. A multiple louver damper as defined by claim 9 in which said louvers are enclosed by a rectangular frame having two sides extending along and abutting the ends of the louvers in all degrees of expansion thereof and other sides in sealing engagement with the outer margins of the outer louvers when the louvers are expanded to close said passages.

11. A multiple louver damper as defined by claim 9 in which said seal members are formed as separate strips of yieldable material.

References Cited in the file of this patent

UNITED STATES PATENTS

| | | |
|---|---|---|
| 1,931,356 | Porter | Oct. 17, 1933 |
| 2,672,088 | Orr | Mar. 16, 1954 |